Patented May 25, 1954

2,679,486

UNITED STATES PATENT OFFICE 2,679,486

PROCESS FOR BREAKING PETROLEUM EMULSIONS

Melvin De Groote, University City, Mo., assignor to Petrolite Corporation, Wilmington, Del., a corporation of Delaware No Drawing. Application June 27, 1952
Serial No. 296,085

14 Claims. (Cl. 252—344)

This invention relates to processes or procedures particularly adapted for preventing, breaking or resolving emulsions of the water-in-oil type, and particularly petroleum emulsions.

The present invention is a continuation-in-part of my copending application, Serial No. 288,744, filed May 19, 1952.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The demulsifying agents employed in the present demulsifying process are the products obtained by the process of condensing (a) oxyalkylation-susceptible, fusible, nonoxygenated-organic solvent-soluble, water-insoluble, low-stage phenol-aldehyde resins of the type described hereinafter as component (a) in Part 1; (b) a basic nonhydroxylated polyamine of the type described hereinafter as component (b) in Part 1, and (c) formaldehyde; said condensation reaction being conducted at a temperature sufficiently high to eliminate water and below the pyrolytic point of the reactants and resultants of reaction. Another aspect of the invention, of course, is the procedure employed for making such condensation products.

As far as the use of the herein described products goes for purpose of resolution of petroleum emulsions of the water-in-oil type, I particularly prefer to use those which as such or in the form of the free base or hydrate, i. e., in combination with water or particularly in the form of a salt of a low molal organic acid such as the acetate or hydroxy acetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethyl-ether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

Reference is again made to U. S. Patent 2,499,368 dated March 7, 1950, to De Groote and Keiser. In said immediately aforementioned patent the following test appears:

"The same is true in regard to the oxyalkylated resins herein specified, particularly in the lower stage of oxyalkylation, the so-called 'sub-surface-active' stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

"If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

"In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

"In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

"The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emlusification or the presence of emulsifying properties and go through the range of homogeneous dispersibility or admixture with water even in presence of added water-insoluble solvent and minor proportions of common electrolytes as occur in oil field brines.

"Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion."

For convenience, what is said hereinafter will be divided into five parts:

Part 1 is the introductory part as far as the demulsifying agents themselves are concerned, i. e., the amine-modified resins;

Part 2 is concerned with the general structure of the amine-modified resin and also the resin itself, which is used as a raw material;

Part 3 is concerned with appropriate nonhydroxylated polyamines which may be employed in the preparation of the herein described amine-modified resins;

Part 4 is concerned with the reactions involving the resin, the amine, and formaldehyde to produce the specific products or compounds; and Part 5 is concerned with the use of the oil-modified resins obtained as described in Part 4 for the resolution of emulsions of the water-in-oil type.

PART 1

As previously stated, this invention is concerned with the use as demulsifiers for resolution or breaking of petroleum emulsions of the water-in-oil type of certain amine-modified resins. Such amine-modified resins have been described in the aforementioned co-pending application, Serial No. 288,744, filed May 19, 1952.

The demulsifying agents are heat-stable oxyalkylation - susceptible resinous condensation products of (a) a defined phenol-aldehyde resin, (b) a defined basic non-hydroxylated polyamine, and (c) formaldehyde. The condensation reaction is conducted at a temperature sufficiently high to eliminate water and below the pyrolytic point of the reactants and the resultants of reaction. Another aspect of the invention, of course, is the procedure employed for making such condensation products.

The phenol-aldehyde resin designated as component (a) is an oxyalkylation-susceptible, fusible, non-oxygenated organic solvent-soluble, water-insoluble, low stage phenol-aldehyde resin having an average molecular weight corresponding to at least 3 and not over 6 phenolic nuclei per resin molecule. The phenol-aldehyde resin is difunctional only in regard to methylol-forming reactivity, and the resin is derived by reaction between a difunctional monohydric phenol and an aldehyde having not over 8 carbon atoms and reactive toward the phenol. Also, the resin is formed in the substantial absence of trifunctional phenols. The phenol constituent of the resin is of the formula:

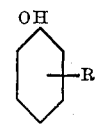

in which R is an aliphatic hydrocarbon radical having at least 4 carbon atoms and not more than 24 carbon atoms, and substituted in the 2,4,6 position.

The basic nonhydroxylated polyamine designated as component (b) has at least one secondary amino group and not over 32 carbon atoms in any radical attached to any amino nitrogen atom. Also, the polyamine is free from any primary amino radical, any substituted imidazoline radical and any substituted tetrahydropyrimidine radical.

This invention in a more limited aspect relates to the use as demulsifiers of certain polyamine-modified thermoplastic phenol-aldehyde resins. For purpose of simplicity the invention as far as demulsification is concerned, may be typified by reference to the resinous materials themselves. These resins may be exemplified by an idealized formula which may, in part, be an oversimplification in an effort to present certain resin structure. Such formula would be the following:

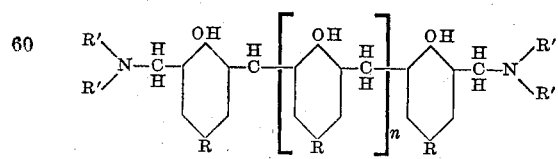

in which R represents an aliphatic hydrocarbon substituent generally having four and not over 18 carbon atoms but most preferably not over 14 carbon atoms, and n generally is a small whole number varying from 1 to 4. In the resin structure it is shown as being derived from formaldehyde although obviously other aldehydes are equally satisfactory. The amine residue in the above structure is derived from a nonhydroxylated basic polyamine and usually a strongly basic polyamine having at least one secondary amino radical and free from any primary amino radical, any substituted imidazoline radical and any substituted tetrahydropyrimidine radical, and may be indicated thus:

in which R' represents any appropriate hydrocarbon radical, such as an alkyl, alicyclic, arylalkyl radical, etc., free from hydroxyl radicals, with the proviso that at least one occurrence of R' contains an amino radical which is not part of a primary amino radical or part of a substituted imidazoline radical or part of a substituted tetrahydropyrimidine radical.

Actually, what has been depicted in the formula immediately above is only an over-simplified exemplification of that part of the polyamine which has the reactive secondary amino group. Actually, a more complete illustration is obtained by reference to substituted polyalkylene amines of the following structure:

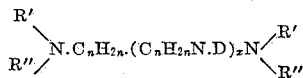

in which R' has its prior significance, R" represents a hydrogen atom or radical R', D is a hydrogen atom or an alkyl group, $n$ represents the numerals 1 to 10, and $x$ represents a small whole number varying from 1 to 7 but generally from 1 to 3, with the proviso that the other previously stated requirements are met. See U. S. Patent No. 2,250,176 dated July 22, 1941, to Blair.

See also U. S. Patent No. 2,362,464 dated November 14, 1944, to Britton et al., which describes alkylene diamines and polymethylene diamines having the formula

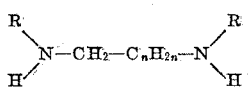

where R represents an alkyl, alkenyl, cycloalkyl, or aralkyl radical, and $n$ represents a comparatively smaller integer such as 1 to 8.

A further limation in light of the required basicity is that the secondary amino radical shall not be directly joined to an aryl radical or acyl radical or some other negative radical. Needless to say, what has been stated above in regard to the groups attached to nitrogen is not intended to exclude an oxygen-interrupted linkage or a ring linkage as in the instance of compounds obtained by converting an N-aminoalkylmorpholine of the formula

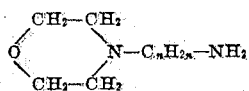

wherein $n$ is a whole number from 2 to 12 inclusive, and the nitrogen atoms are separated by at least two carbon atoms, into a secondary amine by means of an alkylating agent, such as dimethyl sulfate, benzyl chloride, an alkyl bromide, an ester of a sulfonic acid, etc., so as to yield a compound such as

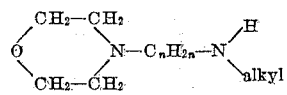

The introduction of two such polyamine radicals into a comparatively small resin molecule, for instance, one having 3 to 6 phenolic nuclei as specified, alters the resultant product in a number of ways. In the first place, a basic nitrogen atom, of course adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect.

Combinations, resinous or otherwise, have been prepared from phenols, aldehydes, and reactive amines, particularly amines having secondary amino groups. Generally speaking, such materials have fallen into three classes; the first represents non-resinous combinations derived from phenols as such; the second class represents resins which are usually insoluble and used for the purpose for which ordinary resins, particularly thermo-setting resins are adapted. The third class represents resins which are soluble as initially prepared but are not heat-stable, i. e., they are heat-convertible, which means they are not particularly suited as raw materials for subsequent chemical reaction which requires temperatures above the boiling point of water or thereabouts.

The third class of material which of the three classes mentioned approaches the closest to the herein-described derivatives or resinous amino derivatives is described in U. S. Patent No. 2,031,557, dated February 18, 1936, to Bruson. The procedure described in said Bruson patent apparently is concerned with the use of monoamines only.

The resins employed as raw materials in the instant procedure are characterized by the presence of an aliphatic radical in the ortho or para position, i. e., the phenols themselves are difunctional phenols. This is a differentiation from the resins described in the aforementioned Bruson patent, No. 2,031,557, insofar that said patent discloses suitable resins obtained from meta-substituted phenols, hydroxybenzene, resorcinol, p,p' (dihydroxydiphenyl)-dimethylmethane, and the like, all of which have at least three points of reaction per phenolic nuclei and as a result can yield resins which may be at least incipiently cross-linked even though they are apparently still soluble in oxygenated organic solvents or else are heat-reactive insofar that they may approach insolubility or become insoluble due to the effect of heat, or added formaldehyde, or both.

The resins herein employed contain only two terminal groups which are reactive to formaldehyde, i. e., they are difunctional from the standpoint of methylol-forming reactions. As is well known, although one may start with difunctional phenols, and depending on the procedure employed, one may obtain cross-linking which indicates that one or more of the phenolic nuclei have been converted from a difunctional radical to a trifunctional radical, or in terms of the resin, the molecule as a whole has a methylol-forming reactivity greater than 2. Such shift can take place after the resin has been formed or during resin formation. Briefly, an example is simply where an alkyl radical, such as methyl, ethyl, propyl, butyl, or the like, shifts from an ortho position to a meta position, or from a para position to a meta position. For instance, in the case of phenol-aldehyde varnish resins, one can prepare at least some in which the resins, instead of having only two points of reaction can have three, and possibly more points of reaction, with formaldehyde, or any other reactant which tends to form a methylol or substituted methylol group.

Apparently there is no similar limitation in regard to the resins employed in the aforementioned Bruson Patent 2,031,557, for the reason that one may prepare suitable resins from phenols of the kind already specified which invariably and inevitably would yield a resin having a functionality greater than two in the ultimate resin molecule.

The resins herein employed are soluble in a non-oxygenated hydrocarbon solvent, such as benzene or xylene. As pointed out in the aforementioned Bruson Patent 2,031,557, one of the objectives is to convert the phenol-aldehyde resins employed as raw materials in such a way as to render them hydrocarbon soluble, i. e., soluble in benzene. The original resins of U. S. Patent 2,031,557, are selected on the basis of solubility in an oxygenated inert organic solvent, such as alcohol or dioxane. It is immaterial whether the resins here employed are soluble in dioxane or alcohol, but they must be soluble in benzene.

The resins herein employed as raw materials must be comparatively low molal products having on the average 3 to 6 nuclei per resin molecule. The resins employed in the aforementioned U. S. Patent No. 2,031,557, apparently need not meet any such limitations.

The condensation products here obtained, whether in the form of the free base or the salt, do not go over to the insoluble stage on heating. This apparently is not true of the materials described in aforementioned Bruson Patent 2,031,557 and apparently one of the objectives with which the invention is concerned, is to obtain a heat-convertible condensation product. The condensation product obtained according to the present invention is heat stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

Although these condensation products have been prepared primarily with the thought in mind that they are precursors for subsequent reaction, yet as such and without further reaction, they have definitely valuable properties and uses as hereinafter pointed out.

What has been said previously in regard to heat stability, particularly when employed as a reactant for preparation of derivatives, is still important from the standpoint of manufacture of the condensation products themselves insofar that in the condensation process employed in preparing the compounds described subsequently in detail, there is no objection to the employing of a temperature above the boiling point of water. As a matter of fact, all the examples included subsequently employ temperatures going up to 140° to 150° C. If one were using resins of the kind described in U. S. Patent No. 2,031,557 it appears desirable and perhaps absolutely necessary that the temperature be kept relatively low, for instance, between 20° C. and 100° C., and more specifically at a temperature of 80° to 90° C. There is no such limitation in the condensation procedure herein described for reasons which are obvious in light of what has been said previously.

What is said above deserves further amplification at this point for the reason that it may shorten what is said subsequently in regard to the production of the herein described condensation products. As pointed out in the instant invention the resin selected is xylene or benzene soluble, which differentiates the resins from those employed in the aforementioned Bruson Patent No. 2,031,557. Since formaldehyde generally is employed economically in an aqueous phase (30% to 40% solution, for example) it is necessary to have manufacturing procedure which will allow reactions to take place at the interface of the two immiscible liquids, to wit, the formaldehyde solution and the resin solution, on the assumption that generally the amine will dissolve in one phase or the other. Although reactions of the kind herein described will begin at least at comparatively low temperatures, for instance, 30° C., 40° C., or 50° C., yet the reaction does not go to completion except by the use of the higher temperatures. The use of higher temperatures means, of course, that the condensation product obtained at the end of the reaction must not be heat-reactive. Of course, one can add an oxygenated solvent such as alcohol, dioxane, various ethers of glycols, or the like, and produce a homogeneous phase. If this latter procedure is employed in preparing the herein described condensations it is purely a matter of convenience, but whether it is or not, ultimately the temperature must still pass within the zone indicated elsewhere, i. e., somewhere above the boiling point of water unless some obvious equivalent procedure is used.

Any reference, as in the hereto appended claims, to the procedure employed in the process is not intended to limit the method or order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

PART 2

It is well known that one can readily purchase on the open market, or prepare, fusible, organic solvent-soluble, water-insoluble resin polymers of a composition approximated in an idealized form by the formula

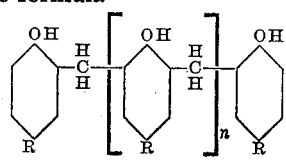

In the above formula n represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., n varies from 1 to 4; R represents an aliphatic hydrocarbon substituent, generally an alkyl radical having from 4 to 14 carbon atoms, such as a butyl, amyl, hexyl, decyl, or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance, paraphenylphenol, one may obtain a resin which is not soluble in a nonoxygenated solvent, such as benzene, or xylene, but requires an oxygenated solvent such as a low molal alcohol, dioxane, or diethylglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368 dated March 7, 1950, to De Groote and Keiser. In said patent there are described phenol-aldehyde resins of the type noted as component (a) in Part 1 above.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

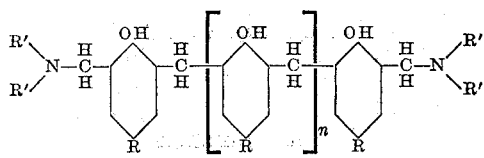

The basic polyamine may be designated thus:

subject to what has been said previously as to the presence of at least one secondary amine radical in at least one occurrence of R' with the proviso, as previously stated, that the amine radical be other than a primary amine radical, a substituted imidazoline radical or a substituted tetrahydropyrimidine radical. However, if one attempts to incorporate into the formula

a structure such as a substituted polyalkyleneamine of the following type:

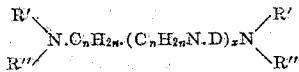

in which the various characters have the same significance as in initial presentation of this formula, then one becomes involved in added difficulties in presenting an overall picture. Thus, for sake of simplicity, the polyamine will be depicted as

subject to the limitation and explanation previously noted.

In conducting reactions of this kind one does not necessarily obtain a hundred per cent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

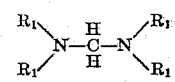

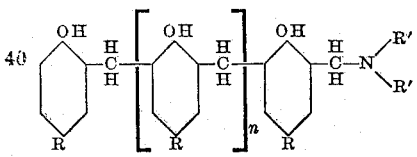

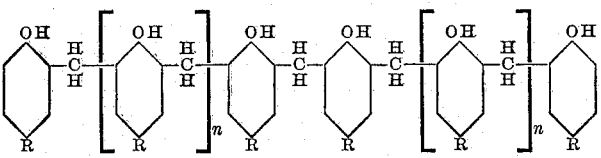

As has been pointed out previously, as far as the resin unit goes one can use a mole of aldehyde other than formaldehyde, such as acetaldehyde, propionaldehyde or butyraldehyde. The resin unit may be exemplified thus:

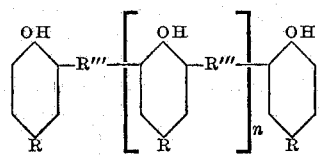

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Example Number | R | Position of R | R'' derived from— | $n$ | Mol. Wt. of Resin Molecule |
|---|---|---|---|---|---|
| 1a | phenyl | para | formaldehyde | 3.5 | 992.5 |
| 2a | tertiary butyl | do | do | 3.5 | 882.5 |
| 3a | secondary butyl | ortho | do | 3.5 | 882.5 |
| 4a | cyclo-hexyl | para | do | 3.5 | 1,025.5 |
| 5a | tertiary amyl | do | do | 3.5 | 959.5 |
| 6a | Mixed secondary and tertiary amyl. | ortho | do | 3.5 | 805.5 |
| 7a | propyl | para | do | 3.5 | 805.5 |
| 8a | tertiary hexyl | do | do | 3.5 | 1,036.5 |
| 9a | octyl | do | do | 3.5 | 1,190.5 |
| 10a | nonyl | do | do | 3.5 | 1,267.5 |
| 11a | decyl | do | do | 3.5 | 1,344.5 |
| 12a | dodecyl | do | do | 3.5 | 1,498.5 |
| 13a | tertiary butyl | do | acetaldehyde | 3.5 | 945.5 |
| 14a | tertiary amyl | do | do | 3.5 | 1,022.3 |
| 15a | nonyl | do | do | 3.5 | 1,330.5 |
| 16a | tertiary butyl | do | butyraldehyde | 3.5 | 1,071.5 |
| 17a | tertiary | do | do | 3.5 | 1,148.5 |
| 18a | nonyl | do | do | 3.5 | 1,456.5 |
| 19a | tertiary butyl | do | propionaldehyde. | 3.5 | 1,008.5 |
| 20a | tertiary amyl | do | do | 3.5 | 1,085.5 |
| 21a | nonyl | do | do | 3.5 | 1,393.5 |
| 22a | tertiary butyl | do | formaldehyde | 4.2 | 996.6 |
| 23a | tertiary amyl | do | do | 4.2 | 1,083.4 |
| 24a | nonyl | do | do | 4.2 | 1,430.6 |
| 25a | tertiary butyl | do | do | 4.8 | 1,094.4 |
| 26a | tertiary amyl | do | do | 4.8 | 1,189.6 |
| 27a | nonyl | do | do | 4.8 | 1,570.4 |

PART 3

As has been pointed out, the amine herein employed as a reactant is a basic secondary polyamine and preferably a strongly basic secondary polyamine free from hydroxyl groups, free from primary amino groups, free from substituted imidazoline groups, and free from substituted tetrahydropyrimidine groups, in which the hydrocarbon radicals present, whether monovalent or divalent are alkyl, alicyclic, arylalkyl, or heterocyclic in character.

Previous reference has been made to a number of polyamines which are satisfactory for use as reactants in the instant condensation procedure. The cheapest amines available are polyethylene amines and polypropylene amines. In the case of the polyethylene amines there may be as many as 5, 6 or 7 nitrogen atoms. Such amines are susceptible to terminal alkylation or the equivalent, i. e., reactions which convert the terminal primary amino group or groups into a secondary or tertiary amine radical. In the case of polyamines having at least 3 nitrogen atoms or more, both terminal groups could be converted into tertiary groups, or one terminal group could be converted into a tertiary group and the other into a secondary amine group. By way of example the following formulas are included. It will be noted they include some polyamines which, instead of being obtained from ethylene dichloride, propylene dichloride, or the like, are obtained from dichloroethyl ethers in which the divalent radical has a carbon atom chain interrupted by an oxygen atom:

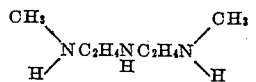

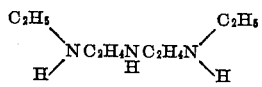

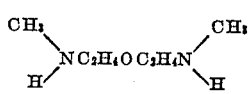

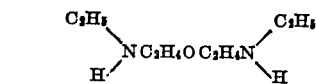

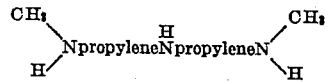

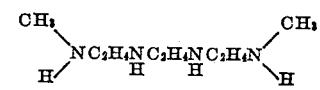

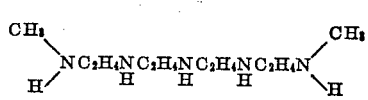

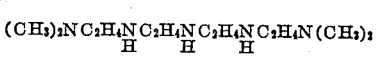

Another procedure for producing suitable polyamines is a reaction involving first an alkylene imine, such as ethylene imine or propylene imine, followed by an alkylating agent of the kind described, for example, dimethylsulfate; or else a reaction which involves an alkylene oxide, such as ethylene oxide or propylene oxide, followed by the use of an alkylating agent or the comparable procedure in which a halide is used.

What has been said previously may be illustrated by reactions involving a secondary alkyl amine, or a secondary aralkyl amine, or a secondary alicyclic amine, such as dibutylamine, dibenzylamine, dicyclohexylamine, or mixed amines with an imine so as to introduce a primary amino group which can be reacted with an alkylating agent, such as dimethylsulfate. In a somewhat similar procedure the secondary amine of the kind just specified can be reacted with an alkylene oxide such as ethylene oxide, propylene oxide, or the like, and then reacted with an imine followed by the final step noted above in order to convert the primary amino group into a secondary amino group.

Reactions involving the same two classes of reactants previously described, i. e., a secondary amine plus an imine plus an alkylating agent, or a secondary amine plus an alkylene oxide plus an imine plus an alkylating agent, can be applied to another class of primary amines which are particularly desirable for the reason that they introduce a definite hydrophile effect by virtue of an ether linkage, or repetitious ether linkage, are certain basic polyether amines of the formula:

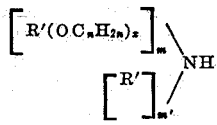

in which $x$ is a small whole number having a value of 1 or more, and may be as much as 10 or 12; $n$ is an integer having a value of 2 to 4, inclusive; $m$ represents the numeral 1 to 2; and $m'$ represents a number 0 to 1, with the proviso that the sum of $m$ plus $m'$ equals 2; and R' has its prior significance, particularly as a hydrocarbon radical.

The preparation of such amines has been described in the literature and particularly in two United States patents, to wit, U. S. Nos. 2,325,514 dated July 27, 1943 to Hester, and 2,355,337 dated August 8, 1944, to Spence. The latter patent describes typical haloalkyl ethers such as CH₃OC₂H₄Cl

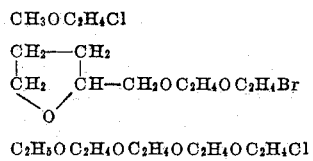

C₂H₅OC₂H₄OC₂H₄OC₂H₄OC₂H₄Cl

Such haloalkyl ethers can react with ammonia, or with a primary amine such as methylamine, ethylamine, cyclohexylamine, etc., to produce a secondary amine of the kind above described, in which one of the groups attached to nitrogen is typified by R'. Such haloalkyl ethers also can be reacted with ammonia to give secondary amines as described in the first of the two patents mentioned immediately preceding. Monoamines so obtained and suitable for conversion into appropriate polyamines are exemplified by (CH₃OCH₂CH₂CH₂CH₂CH₂CH₂)₂NH.

Other somewhat similar secondary monoamines equally suitable for such conversion reactions in order to yield appropriate secondary amines, are those of the composition

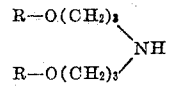

as described in U. S. Patent No. 2,375,659 dated May 8, 1945, to Jones et al. In the above formula R may be methyl, ethyl, propyl, amyl, octyl, etc.

Other suitable secondary amines which can be converted into appropriate polyamines can be obtained from products which are sold in the open market, such as may be obtained by alkylation of cyclohexylmethylamine or the alkylation of similar primary amines, or for that matter, amines of the kind described in U. S. Patent No. 2,482,546 dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other secondary monoamines suitable for conversion into polyamines are the kind described in British Patent No. 456,517 and may be illustrated by

C₁₂H₂₅—O—CH₂—CH₂—O—
CH₂—CH₂—NH—CH₂

In light of the various examples of polyamines which have been used for illustration it may be well to refer again to the fact that previously the amine was shown as

with the statement that such presentation is an over-simplification. It was pointed out that at least one occurrence of R' must include a secondary amino radical of the kind specified. Actually, if the polyamine radical contains two or more secondary amino groups the amine may react to two different positions and thus the same amine may yield compounds in which R' and R' are dissimilar. This is illustrated by reference to two prior examples:

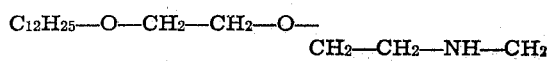

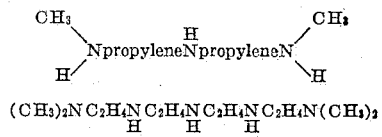

In the first of the two above formulas if the reaction involves a terminal amino hydrogen obviously the radicals attached to the nitrogen atom, which in turn combines with the methylene bridge, would be different than if the reaction took place at the intermediate secondary amino radical as differentiated from the terminal group. Again, referring to the second formula above, although a terminal amino radical is not involved it is obvious again that one could obtain two different structures for the radicals attached to the nitrogen atom united to the methylene bridge, depending whether the reaction took place at either one of the two outer secondary amino groups, or at the central secondary amino group. If there are two points of reactivity towards formaldehyde as illustrated by the above examples it is obvious that one might get a mixture in which in part the reaction took place at one point and in part at another point. Indeed, there are well known suitable polyamine reactions where a large variety of compounds might be obtained due to such multiplicity of reactive radicals. This can be illustrated by the following formula:

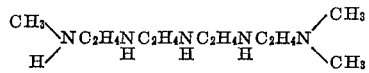

Over and above the specific examples which have appeared previously, attention is directed to the fact that added suitable polyamines are shown in subsequent Table II.

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethylene glycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation? and the third factor is this, (c) is an effort to be made to purify the reaction mass by the usual procedure as, for example, a water-wash to remove the water-soluble unreacted formaldehyde, if any, or a water-wash to remove any unreacted water-soluble polyamine, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the polyamine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out I prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. I have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C. for 4 or 5 hours, or at the most, up to 10-24 hours, I then complete the reaction by raising the temperature up to 150° C., or thereabouts as required. The initial low temperature procedure can be eliminated or reduced to merely the shortest period of time which avoids loss of polyamine or formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C. and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the secondary polyamine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of amine and, again, have not found any particular advantage in so doing. Whenever feasible I have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In the hereto attached claims reference is made to the product as such, i. e., the anhydro base. Needless to say, the hydrated base, i. e., the material as it combines with water or the salt form, with a combination of suitable acids as noted, is essentially the same material but is merely another form and, thus, the claims are intended to cover all three forms, i. e., the anhydro base, the free base, and the salts.

In light of what has been said previously, little more need be said as to the actual procedure employed for the preparation of the herein described condensation products. The following example will serve by way of illustration:

Example 1b

The phenol-aldehyde resin is the one that has been identified previously as Example 2a. It was obtained from a paratertiary butyl phenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei excluding the 2 external nuclei, or 5 and 6 overall nuclei. The resin so obtained in a neutral state had a light amber color.

882 grams of the resin identified as 2a preceding were powdered and mixed with a somewhat lesser weight of xylene, i. e., 600 grams. The mixture was refluxed until solution was complete. It was then adjusted to approximately 30° to 35° C. and 176 grams of symmetrical dimethylethylene diamine added. The mixture was stirred vigorously and formaldehyde added slowly. In this particular instance the formaldehyde used was a 30% solution and 200 grams were employed which were added in a little short of 3 hours. The mixture was stirred vigorously and kept within a temperature range of 30° to 46° C. for about 19 hours. At the end of this time it was refluxed, using a phase-separating trap and a small amount of aqueous distillate withdrawn from time to time. The presence of unreacted formaldehyde was noted. Any unreacted formaldehyde seemed to disappear within approximately two to three hours after refluxing started. As soon as the odor of formaldehyde was no longer detectible the phase-separating trap was set so as to eliminate all the water of solution and reaction. After the water was eliminated part of the xylene was removed until the temperature reached approximately 152° C. or slightly higher. The mass was kept at this higher temperature for three to four hours and reaction stopped. During this time, any additional water which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or tacky resin. The overall time for reaction was somewhat less than 30 hours. In other examples, it varied from a little over 20 hours up to 36 hours. The time can be reduced by cutting the low temperature period to approximately 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin Used | Amt., grs. | Amine Used and Amount | Strength of Formaldehyde Soln. and Amt. | Solvent Used and Amt. | Reaction Temp., °C. | Reaction Time (hrs.) | Max. Distill Temp., °C. |
|---|---|---|---|---|---|---|---|---|
| 1b | 2a | 882 | Amine A, 176 g | 30%, 200 g | Xylene, 600 g | 20–23 | 26 | 152 |
| 2b | 5a | 480 | Amine A, 88 g | 30%, 100 g | Xylene, 450 g | 20–21 | 24 | 150 |
| 3b | 10a | 633 | do | 30%, 100 g | Xylene, 550 g | 20–22 | 28 | 151 |
| 4b | 2a | 441 | Amine B, 116 g | 37%, 81 g | Xylene, 400 g | 20–28 | 36 | 144 |
| 5b | 5a | 480 | do | do | Xylene, 450 g | 22–30 | 25 | 156 |
| 6b | 10a | 633 | do | do | Xylene, 600 g | 21–28 | 32 | 150 |
| 7b | 2a | 882 | Amine C, 204 g | 30%, 200 g | do | 21–23 | 30 | 145 |
| 8b | 5a | 480 | Amine C, 102 g | 37%, 100 g | Xylene, 450 g | 20–25 | 35 | 148 |
| 9b | 10a | 633 | do | do | Xylene, 500 g | 20–27 | 35 | 143 |
| 10b | 13a | 473 | Amine D, 117 g | 37%, 81 g | Xylene, 425 g | 20–22 | 31 | 145 |
| 11b | 14a | 511 | do | do | Xylene, 500 g | 21–26 | 24 | 146 |
| 12b | 15a | 665 | do | do | Xylene, 550 g | 22–25 | 36 | 151 |
| 13b | 2a | 441 | Amine E, 158 g | do | Xylene, 400 g | 25–38 | 32 | 150 |
| 14b | 5a | 480 | do | do | do | 21–24 | 30 | 152 |
| 15b | 9a | 595 | do | do | Xylene, 550 g | 21–26 | 27 | 145 |
| 16b | 2a | 441 | Amine F, 191 g | 30%, 100 g | Xylene, 400 g | 20–23 | 25 | 141 |
| 17b | 2a | 480 | do | do | do | 22–27 | 29 | 143 |
| 18b | 14a | 511 | do | do | Xylene, 450 g | 23–25 | 36 | 149 |
| 19b | 22a | 498 | do | do | do | 21–26 | 32 | 148 |
| 20b | 23a | 542 | Amine G, 174 g | do | Xylene, 500 g | 21–23 | 30 | 148 |
| 21b | 25a | 547 | do | do | do | 20–26 | 36 | 152 |
| 22b | 2a | 441 | do | do | Xylene, 440 g | 21–24 | 32 | 150 |
| 23b | 26a | 595 | Amine H, 282 g | 37%, 81 g | Xylene, 500 g | 21–28 | 25 | 150 |
| 24b | 27a | 391 | Amine H, 141 g | 30%, 50 g | Xylene, 350 g | 21–22 | 28 | 151 |

As to the formulas of the above amines referred to as Amine A through Amine H, inclusive, see immediately below:

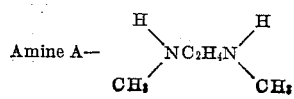

Amine A—

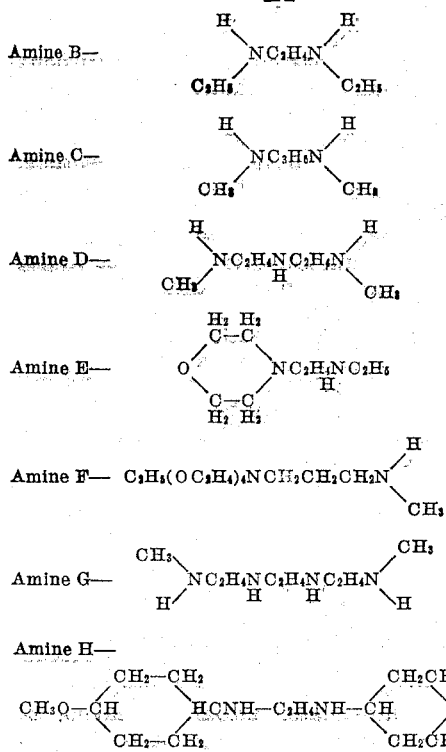

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

The product of Example 20b, 20%;

A cyclohexylamine salt of a polypropylated naphthalene monosulfonic acid, 24%;

An ammonium salt of a polypropylated napthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The compounds herein described and particularly those adapted for breaking petroleum emulsions although having other uses as noted in my co-pending application, Serial No. 288,744, filed May 19, 1952, are derived from resins in which the bridge between phenolic nuclei is a methylene group or a substituted methylene group.

Comparable amine-modified compounds serving all these various purposes are obtainable from another class of resins, i. e., those in which the phenolic nuclei are separated by a radical having at least a 3-carbon atom chain and are obtained, not by the use of a single aldehyde but by the use of formaldehyde, in combination with a carbonyl compound selected from the class of aldehydes and ketones in which there is an alpha hydrogen atom available as in the case of acetaldehyde or acetone. Such resins almost invariably involve the use of a basic catalyst. Such bridge radicals between phenolic nuclei have either hydroxyl radicals or carbonyl radicals, or both, and are invariably oxyalkylation-susceptible and may also enter into more complicated reactants with basic secondary amines. The bridge radical in the initial resin has distinct hydrophile character. Such resins, or compounds which can be readily converted into such resins, are described in the following patents. Such analogous compounds are not included as part of the instant invention.

U. S. Patents Nos. 2,191,802, dated February 27, 1940, to Novotny et al.; 2,448,664, dated September 7, 1948, to Fife et al.; 2,538,883, dated January 23, 1951, to Schrimpe; 2,538,884, dated January 23, 1951, to Schrimpe; 2,545,559, dated March 20, 1951, to Schrimpe; 2,570,389, dated October 9, 1951, to Schrimpe.

Having thus described my invention what I claim as new and desire to secure by Letters Patent, is

1. A process for breaking petroleum emulsions of the water-in-oil type characterized by subjecting the emulsion to the action of a demulsifier including the products obtained in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

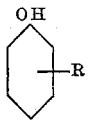

in which R is an aliphatic hydrocarbon radical having at least 4 and not more than 24 carbon atoms and substituted in the 2,4,6 position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible.

2. A process for breaking petroleum emulsions of the water-in-oil type characterized by subjecting the emulsion to the action of a demulsifier including the products obtained in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

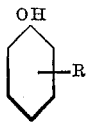

in which R is an aliphatic hydrocarbon radical having at least 4 and not more than 24 carbon atoms and substituted in the 2,4,6 position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule, with the further proviso that the ratio of reactants be approximately 1, 2 and 2 respectively; and with the final proviso that the resinous condensation product resulting from the process be heat-stable and oxyalkylation-susceptible.

3. A process for breaking petroleum emulsions of the water-in-oil type characterized by subjecting the emulsion to the action of a demulsifier including the products obtained in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

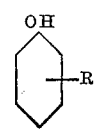

in which R is an aliphatic hydrocarbon radical having at least 4 and not more than 24 carbon atoms and substituted in the 2,4,6 position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible.

4. A process for breaking petroleum emulsions of the water-in-oil type characterized by subjecting the emulsion to the action of a demulsifier including the products obtained in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

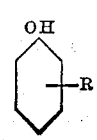

in which R is an aliphatic hydrocarbon radical having at least 4 and not more than 24 carbon atoms and substituted in the 2,4,6 position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible.

5. A process for breaking petroleum emulsions of the water-in-oil type characterized by subjecting the emulsion to the action of a demulsifier including the products obtained in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

in which R is an aliphatic hydrocarbon radical having at least 4 and not more than 14 carbon atoms and substituted in the 2,4,6 position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible.

6. A process for breaking petroleum emulsions of the water-in-oil type characterized by subjecting the emulsion to the action of a demulsifier including the products obtained in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

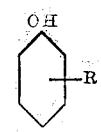

in which R is an aliphatic hydrocarbon radical having at least 4 and not more than 14 carbon atoms and substituted in the 2,4,6 position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical, and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible.

7. A process for breaking petroleum emulsions of the water-in-oil type characterized by subjecting the emulsion to the action of a demulsifier including the products obtained in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

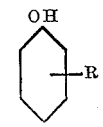

in which R is an aliphatic hydrocarbon radical having at least 4 and not more than 14 carbon atoms and substituted in the para position; (b) a basic nonhydroxylated polyamine having at least one secondary amino group and having not over 32 carbon atoms in any radical attached to any amino nitrogen atom, and with the further proviso that the polyamine be free from any primary amino radical, any substituted imidazoline radical and any substituted tetrahydropyrimidine radical, and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible.

8. The process of claim 1 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

9. The process of claim 2 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

10. The process of claim 3 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

11. The process of claim 4 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

12. The process of claim 5 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

13. The process of claim 6 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously wth 1 to 3 volumes of water.

14. The process of claim 7 with the proviso that the hydrophile properties of the product of the condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

References Cited in the file of this patent

UNITED STATES PATENTS

| Number | Name | Date |
| --- | --- | --- |
| 2,031,557 | Bruson | Feb. 18, 1936 |
| 2,290,154 | Blair | July 21, 1942 |
| 2,457,634 | Bond et al. | Dec. 28, 1948 |
| 2,499,365 | De Groote et al. | Mar. 7, 1950 |
| 2,499,368 | De Groote et al. | Mar. 7, 1950 |
| 2,570,377 | Revukas | Oct. 9, 1951 |